US011313464B2

(12) United States Patent
Miebach et al.

(10) Patent No.: US 11,313,464 B2
(45) Date of Patent: Apr. 26, 2022

(54) PARKING LOCK UNIT AND DRIVE ARRANGEMENT

(71) Applicant: GKN Automotive Limited, Birmingham (GB)

(72) Inventors: Sascha Miebach, Neunkirchen-Seelscheid (DE); Mark Schmidt, Königswinter (DE); Simon Broicher, Hürth (DE); Ervin Szilagyi, Neunkirchen-Seelscheid (DE)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 17/049,631

(22) PCT Filed: Apr. 26, 2018

(86) PCT No.: PCT/EP2018/060816
§ 371 (c)(1),
(2) Date: Oct. 22, 2020

(87) PCT Pub. No.: WO2019/206422
PCT Pub. Date: Oct. 31, 2019

(65) Prior Publication Data
US 2021/0239210 A1   Aug. 5, 2021

(51) Int. Cl.
*F16H 63/34* (2006.01)
*B60T 1/06* (2006.01)
(52) U.S. Cl.
CPC .......... *F16H 63/3425* (2013.01); *B60T 1/062* (2013.01); *F16H 63/3466* (2013.01)
(58) Field of Classification Search
CPC ............. F16H 63/3425; F16H 63/3466; F16H 57/037; F16H 2057/02034; B60T 1/062; B60T 1/005
(Continued)

(56) References Cited

U.S. PATENT DOCUMENTS 3,187,846 A * 6/1965 Powell ................ F16H 63/3416
188/69
5,295,412 A * 3/1994 Donato .................. B60T 1/005
192/114 R
(Continued)

FOREIGN PATENT DOCUMENTS

CN   101628544      *  1/2010
DE   10143 386 A1    4/2003
(Continued)

OTHER PUBLICATIONS

Machine language translation of Wang CN 101628544.*
(Continued)

*Primary Examiner* — Tinh Dang
(74) *Attorney, Agent, or Firm* — Bejin Bieneman PLC

(57) ABSTRACT

A parking lock unit for a drive assembly, in particular with an electric motor, comprises a parking lock housing, a ratchet wheel rotationally fixedly connected to a part of the drive assembly, which is rotatably supported about a rotational axis by at least one bearing, and comprising a connecting portion and an engagement portion which are connected to one another via a web portion; a locking element which is supported in the parking lock housing and can lock and release a rotational movement of the parking ratchet wheel about a longitudinal axis of the parking ratchet wheel, and a controllable locking actuator which can reversibly transfer the locking element into a position locking the parking ratchet wheel and a position releasing the parking ratchet wheel, wherein the parking ratchet wheel is formed such that the engagement portion is axially offset with respect to the connecting portion.

12 Claims, 3 Drawing Sheets

(58) Field of Classification Search
USPC .................................................. 192/219.5
See application file for complete search history.

(56) References Cited

U.S. PATENT DOCUMENTS

| | | | | |
|---|---|---|---|---|
| 5,799,536 | A * | 9/1998 | Janiszewski | ............ B60T 1/005 |
| | | | | 192/44 |
| 2005/0137047 | A1* | 6/2005 | Hay | ...................... F16H 57/037 |
| | | | | 475/220 |
| 2009/0200134 | A1* | 8/2009 | Shintani | .............. F16H 63/3425 |
| | | | | 192/219.5 |
| 2012/0103752 | A1* | 5/2012 | Kim | .................... F16H 63/3416 |
| | | | | 192/219.5 |
| 2012/0329594 | A1* | 12/2012 | Sada | ....................... F16H 3/727 |
| | | | | 475/5 |

FOREIGN PATENT DOCUMENTS

| | | |
|---|---|---|
| DE | 10 2007 007 681 A1 | 8/2008 |
| DE | 10 2011 082 169 A1 | 3/2013 |
| JP | 2009-121550 A | 6/2009 |
| WO | 2018001476 A1 | 1/2018 |

OTHER PUBLICATIONS

International Search Report and Written Opinion for PCT/EP2018/060816 dated Jan. 11, 2019 (12 pages; with English translation).

* cited by examiner

PARKING LOCK UNIT AND DRIVE ARRANGEMENT

CROSS-REFERENCE TO RELATED APPLICATIONS

This application is a national stage of, and claims priority to, Patent Cooperation Treaty Application No. PCT/EP2018/060816, filed on Apr. 26, 2018, which application is hereby incorporated herein by reference in its entirety.

BACKGROUND

A drive assembly may include a parking lock unit whose main task is to hold the vehicle securely in the parked state. Especially by using electrically actuated parking brakes instead of mechanically actuated parking brakes, the parking lock is increasingly becoming the main protection against unintentional movement of the vehicle. The locking effect is usually achieved by a locking element which engages positively in a parking ratchet wheel. The parking lock unit is mechanically or electromechanically configured so as to prevent unintentional engagement above a vehicle speed of 5 km/h. Below a speed of 5 km/h the parking lock unit can be engaged. Due to the resulting torque shock, the machine elements in the power path between the parking lock and the tires on the one hand and between the parking lock and the drive unit on the other hand are loaded and must be dimensioned accordingly.

From WO 2018/001476 A1 a parking lock unit for an electric drive assembly is known. The parking lock unit comprises a parking lock housing, a sleeve-shaped shaft journal which is rotatably supported in the parking lock housing, the shaft journal having a connecting profile for non-rotatable connection to a drive shaft of the electric drive assembly. A ratchet wheel is connected in a rotationally fixed manner to the shaft journal and has a straight wheel body. A ratchet element which is movably mounted in the parking lock housing and can be transferred by a controllable actuator into a closed position for locking the ratchet wheel and into a release position for releasing the ratchet wheel.

SUMMARY

The present disclosure relates to a parking lock unit for a drive assembly of a motor vehicle, in particular with an electric motor, and a drive assembly with such a parking lock unit. The parking lock unit for a drive assembly, by its design, reduces the load on the machine elements of the drive assembly when the parking lock engages. Furthermore, a corresponding drive assembly with such a parking lock unit enables a safe locking of the power path, and can absorb kinetic energy when the parking lock is inserted and requires a small installation space.

A parking lock unit for a drive assembly, especially with an electric motor, is disclosed, comprising: a parking lock housing, a parking ratchet wheel that is rotationally fixedly connected to a part of the drive assembly, which is rotatably supported by at least one bearing about an axis of rotation, and that has a connecting portion and an engagement portion, which are connected to each other via a web portion; a locking element which is supported in the parking lock housing and can lock and release a rotational movement of the parking ratchet wheel about a longitudinal axis of the parking ratchet wheel, and a controllable locking actuator which can reversibly transfer the locking element into a position locking the parking ratchet wheel and into a position releasing the parking ratchet wheel, wherein the parking ratchet wheel is formed designed such that the engagement portion is axially offset relative to the connecting portion.

By engaging the parking lock, the kinetic energy of the rotating parts of the power path between the parking ratchet wheel and the tires on the one side and between the parking ratchet wheel and the drive unit on the other side is converted into impact energy. Through the impact, a radial force component and a tangential force component act on the parking wheel, which also induces a torsional moment. Due to the axial offset of the engagement portion relative to the connecting portion, the proposed parking lock unit has the advantage that the torsional length of the power path between the parking lock and the tires on the one side, and between the parking lock and the drive unit on the other side, is increased and the torsional stiffness of the power path is reduced. In addition, this allows the engagement portion of the parking ratchet wheel to deflect radially so that deformation energy can be stored elastically in the parking wheel. As a result of the two aforementioned effects, a higher proportion of the impact energy can be converted elastically into tensioning energy or deformation energy when the parking lock is engaged, and the load on the machine elements of the drive assembly can be reduced. In a possible embodiment, therefore, a central plane of the engagement portion of the parking ratchet wheel may have a first distance to a central plane of the connecting portion of the parking ratchet wheel which is greater than a smallest axial thickness of the web portion.

The central plane of the parts and/or portions of the parts is to be understood as the respective imaginary plane which is normal to the rotation axis of the respective part and which is located in the center of the extension of the respective part and/or portion of the part along its rotation axis.

The engagement portion of the parking ratchet wheel is a substantially annular body that is arranged radially outside and comprises several engagement recesses that are evenly distributed around the circumference. The locking element can engage in the engagement recesses and lock the rotational freedom of the parking ratchet wheel. Together with the locking element, the recesses can be designed such that above a critical rotational speed the locking element is rejected and thus mechanical engagement of the parking lock is prevented (ratcheting). The width B1 of the ratcheting portion can be selected such that the forces and pressures generated when the parking lock is engaged can be safely transmitted.

The connecting portion of the parking ratchet wheel is a substantially ring-shaped body that forms the radially inner part of the parking ratchet wheel. The sectional surface of a semi-longitudinal section of the connecting portion can be T-shaped. In this case, the connecting portion comprises a substantially sleeve-shaped part extending around the axis of rotation of the parking ratchet wheel and a part projecting radially outwards therefrom. The sleeve-shaped part of the connecting portion is used to connect the parking ratchet wheel to a rotatably supported part of a drive assembly. For this purpose, the area of the inner circumference may be formed cylindrical for a press fit or may have a connecting structure, for example a splines. Any other design as a shaft-hub connection is also conceivable, which enables a rotationally fixed connection. The width B3 of the sleeve-shaped part is defined by the portion that is in contact with the rotationally supported element of the drive assembly and can transmit torque. The width B3 is selected such that the provided torques can be safely transmitted through the shaft-hub connection. In a possible embodiment, the ratio of the width B1 of the parking ratchet wheel at the outer diameter to a width B3 of the parking ratchet wheel at an inner diameter can be less than 1.0, in particular less than 0.85, in particular less than 0.8, and/or greater than 0.7, in particular greater than 0.75. A positioning projection can adjoin the sleeve-shaped part in the axial direction, which is designed such that the parking ratchet wheel can be axially positioned and supported relative to the component to which it is connected in a rotationally fixed manner.

The connecting portion may include a radially outwardly projecting part which serves for a defined introduction of forces and torques from the web portion into the sleeve-shaped part of the connecting portion. The radially outwardly projecting part can be arranged centrally to the sleeve-shaped part, so that an even, in particular symmetrical, load distribution in the shaft-hub connection is ensured. The transition into the connecting portion can be arranged at the region where the wheel body changes from a straight shape to an angled shape. It is also conceivable that the radially outward part is omitted and the web portion is directly connected to the sleeve-shaped part of the connection portion.

The central planes of the engagement portion and the connecting portion are spaced from each other along the longitudinal axis of the parking ratchet wheel so that the parking ratchet wheel has a cranked shape. In a possible embodiment, the ratio of the first distance A1 to an outer diameter Da of the parking ratchet wheel may be greater than 0.08, in particular greater than 0.10, and/or less than 0.5, in particular less than 0.4. In a further embodiment, the ratio of the first distance A1 to a width B1 of the parking ratchet wheel at the outer diameter can be greater than 0.85, in particular greater than 0.9, in particular greater than 0.95, and/or smaller than 3, in particular smaller than 2.7.

The web portion extends between the two previously described portions of the parking ratchet wheel. The shape of the web portion is selected such that the radial stiffness and the torsional stiffness of the parking ratchet wheel are reduced compared to a straight wheel body. The web portion can therefore also be referred to as the spring portion. In a possible embodiment, the web portion can have a thinner wall than the engagement portion and the connecting portion, at least in a partial region. In a further embodiment, the width of the wall of the web portion can increase from radially outside to radially inside at least in a partial region such that the stresses occurring in this partial region are at least substantially constant. This ensures an efficient loading of the material with low torsional and bending stiffness. At least substantially constant stresses should also be understood as stresses that deviate from a constant nominal design stress by +−5%.

In a possible embodiment, the parking ratchet wheel can be arranged on a projecting free shaft end of the rotatably supported part of the drive assembly. Due to the radial force component when the parking ratchet engages, the free shaft end can be bent like a bending beam in the direction of force action. This allows additional deformation energy to be elastically stored in the free shaft end, thus reducing the load on the adjacent machine elements.

In another embodiment, the center plane of the engagement portion of the parking ratchet wheel can be axially located between the center plane of the connecting portion of the parking ratchet wheel and a center plane of the bearing nearest to the parking ratchet wheel. The nearest bearing shall be the bearing which, together with the parking ratchet wheel, is arranged on a rotatably supported part of the drive assembly and which is the closest to the parking ratchet wheel. In this way a compact axial dimension of the parking lock unit can be achieved. In addition, this shifts the plane of force application of the radial locking forces in the direction of the respective nearest bearing and reduces the resulting load on the bearing. In particular, this allows the engagement portion to be positioned above the nearest bearing. For this purpose, the ratio of the first distance A1 to a second distance A2 between the center plane of the connecting portion of the parking ratchet wheel and a center plane of the bearing nearest to the parking ratchet wheel, can be greater than 0.25, in particular greater than 0.35, and/or less than 1.

The locking element and the locking actuator are mounted in the parking lock housing. In addition, the parking lock housing forms a space in which the parking ratchet wheel can be accommodated.

A further embodiment relates to a drive assembly for electromotive driving of a motor vehicle, comprising a previously described parking lock unit, a housing assembly, an electric motor connected to the housing assembly and having a motor shaft which is rotationally drivable; at least one transmission shaft, and a power distribution unit, wherein the motor shaft, the at least one transmission shaft and the power distribution unit are each rotatably supported in the housing assembly and are connected to each other via at least one transmission stage for transmitting movement and torque, and wherein the rotatably supported part to which the parking ratchet wheel is connected in a rotationally fixed manner is one of the parts motor shaft, transmission shaft and power distribution unit (20).

The drive assembly with a parking lock unit has the same advantages as described above in connection with the parking lock unit, which is referred to as an abbreviation.

DESCRIPTION

Figure 1A:
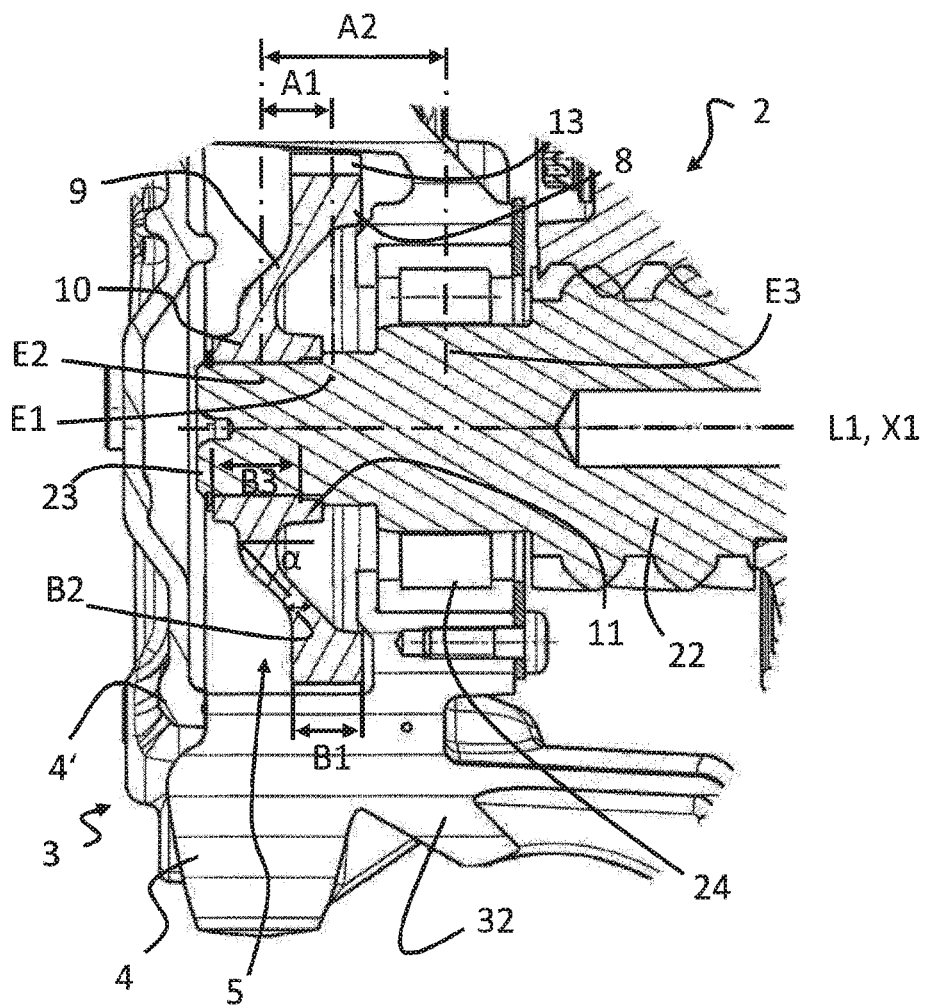
FIG. 1*a*: a parking lock unit in a longitudinal section.
Figure 1B:
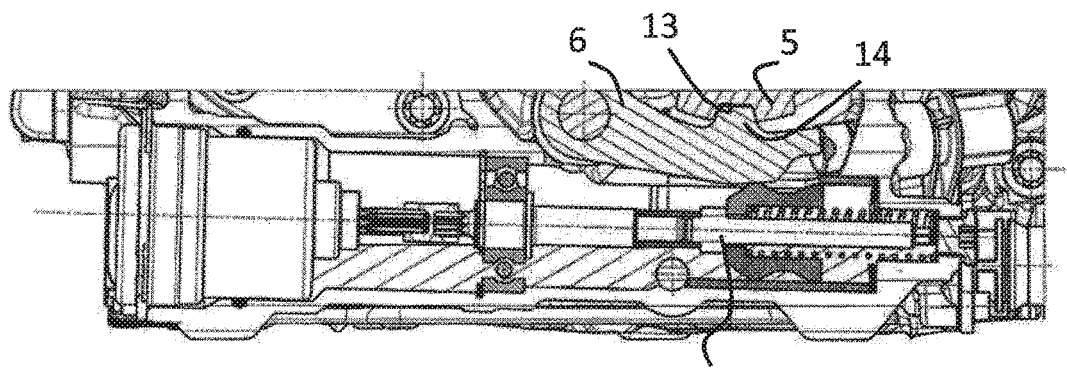
FIG. 1*b*: a partial view of the parking lock unit according to FIG. 1*a* in a cross-section.
Figure 2:
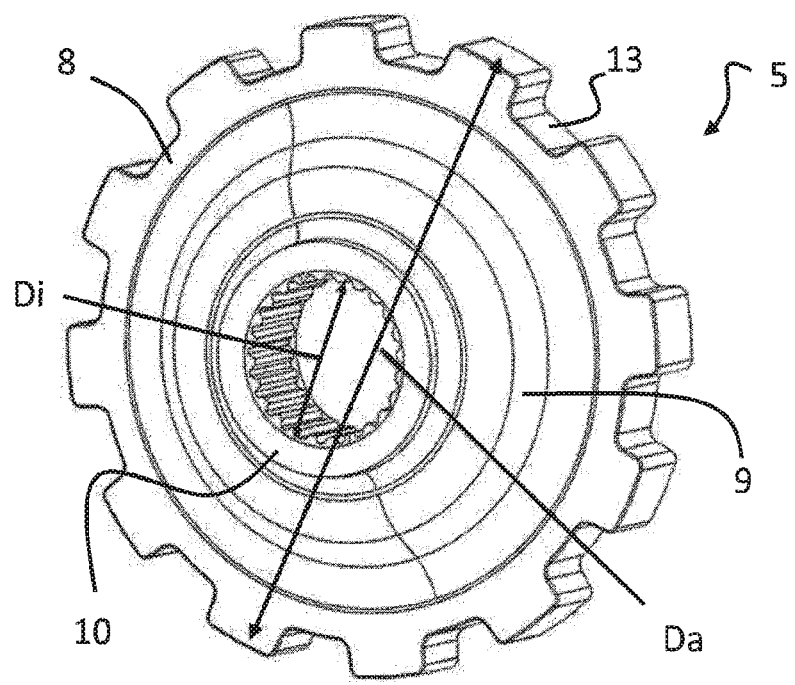
FIG. 2: a parking ratchet wheel of the parking lock unit as shown in FIG. 1 in a perspective view.

FIGS. 1 and 2, which are described together below, show a parking lock unit 2 for a drive assembly of a motor vehicle. A parking lock generally serves to reversibly lock the power path of the drive assembly to prevent the motor vehicle from unintentionally rolling away.

The parking lock unit 2 comprises a parking lock housing 3, a parking ratchet wheel 5, which is rotationally fixedly connected to a rotatably supported part 22 of the drive unit, a locking element 6, which is movably mounted in the parking lock housing 3. By means of a controllable actuator 7 the locking element 6 can be reversibly transferred from a locking position to a release position. The rotatably mounted part is designed as a shaft in the present embodiment, without being restricted to this.

The ratchet wheel 5 has a radially outer engagement portion 8, on the outer circumferential face lying on an outer diameter Da of which, a plurality of evenly distributed engagement recesses 13 are arranged, into which the locking element 6 can engage positively with a ratchet tooth 14. The locking element 6 is shown in a locking position in which it is positively connected to the ratchet wheel 5 so that the parking ratchet wheel 5 is prevented from rotating about its own longitudinal axis. Starting from the locking position, the actuator 7 can reversibly transfer the locking element 6 to a release position in which it is positioned outside the effective range of the ratchet wheel 5 so that the shaft 22, which is connected to the parking ratchet wheel 5 in a rotationally fixed manner, can rotate freely. The engagement portion 8 has a width B1 which is dimensioned such that the forces and pressures resulting from engaging of the parking lock can be safely borne by the parking ratchet wheel 5.

The engagement portion 8 is adjoined radially on the inside by a web portion 9, which in this embodiment is substantially inclined at an inclined angle α of 45° relative to the axis of rotation of the parking ratchet wheel 5 and whose mean width B2 corresponds to approximately 25% of the width B1 of the engagement portion 8. The course of the width B2 of the web portion 9 from radially outside to radially inside is selected such that the stresses that occur are substantially constant. The width B2 and the inclination angle α can be used to adjust both the torsional and bending properties of the web portion, so that they can be designed variably depending on the application. Alternatively, it is also conceivable that the web portion 9 has a course deviating from straight, in particular a meandering course.

The parking ratchet wheel 5 also has a connecting portion 10 radially inside, via which the parking ratchet wheel 5 is connected to a shaft 22. In the embodiment shown, the connection is designed as splined shaft connection with a nominal diameter Di. Alternatively, other shaft-hub connections are also possible, for example a press connection. The sectional surface of the connection portion 10 in a semi-longitudinal section is T-shaped. The width B3 of the torque-carrying region of the cylindrical part can be selected such that any torque occurring can be safely transmitted from the parking ratchet wheel 5 to the shaft. In the embodiment shown, the width B1 of the engagement portion 8 amounts approximately to 0.75 times the width B3 of the connecting portion. A positioning section 11 extends axially adjacent from the cylindrical part of the connecting portion 10, by which the parking ratchet wheel 5 can be positioned and supported axially against the shaft 22. The radially outwardly projecting part of the connecting portion 10 is mainly used to connect the connecting portion 10 to the web portion 9. Depending on the design of the web portion 9, this part can therefore also be omitted. The engagement portion 8 is axially offset from the connecting portion 10. A distance A1 is formed between the imaginary center plane E1 of the engagement portion 8, which is normal to the axis of rotation of the parking ratchet wheel 5, and the imaginary center plane E2 of the connecting portion 10. In this embodiment, the first distance A1 corresponds approximately to the width B1 of the engagement portion and/or 15% of the outer diameter Da of the parking ratchet wheel 5, without being limited thereto.

By engaging the locking element 6 in the parking ratchet wheel 5, the kinetic energy of the rotating parts of the power path to which the parking lock is connected is converted into impact energy. A radial force component and a tangential force component, which also induces a torsional moment or braking torque, act on the parking ratchet wheel 5 as a result of the impact. Due to the axial offset of the planes E1 and E2, and the web portion 9 arranged therebetween, the torsional length of the power path is increased and the torsional stiffness of the power path is reduced. In addition, the engagement portion 8 of the parking ratchet wheel 5 can deflect radially. Both of the above-mentioned effects result in a higher proportion of impact energy being converted into tension energy and/or (elastic) deformation energy when the locking element 6 engages in the parking ratchet wheel 5, thus reducing the load on the adjacent machine elements.

The parking lock housing 3 in the embodiment shown comprises a first housing portion 4, which forms an annular space, and a second housing portion 4' in the form of a housing cover which is screwed to the first housing portion 4. The first housing portion 4 is designed in one piece with a transmission housing 32 of a drive assembly. Alternatively, it is also possible that the parking lock unit 2 can be designed modularly and the parking lock housing 3 is designed such that the housing portion 4 can be connected to the housing of a drive assembly.

Figure 3:
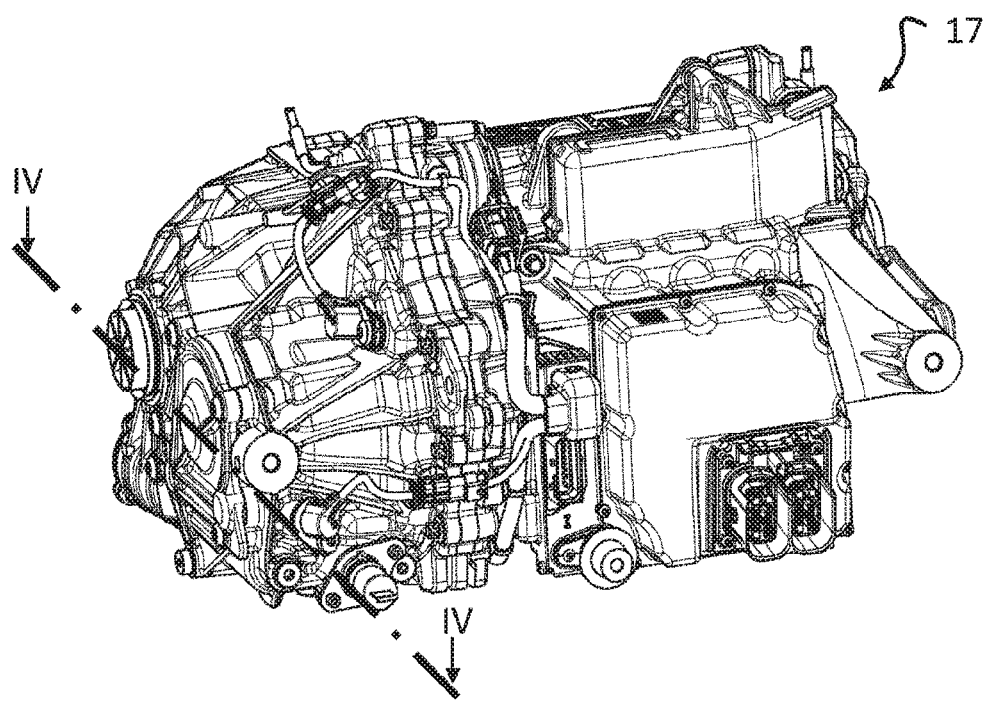
FIG. 3: an electric drive assembly with a parking lock unit as shown in FIG. 1 in a perspective view.
Figure 4:
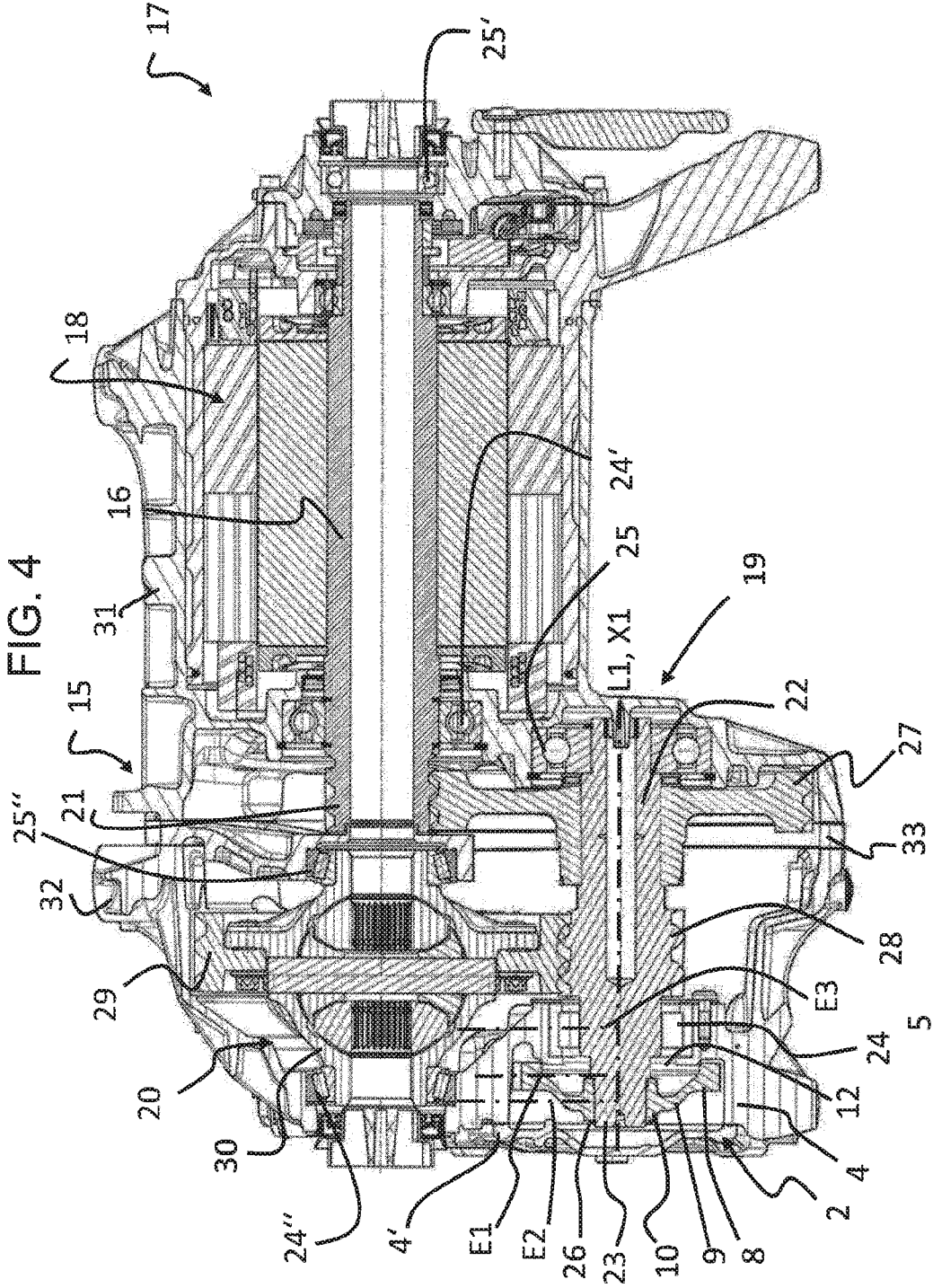
FIG. 4: the drive assembly according to FIG. 3 in a longitudinal section IV-IV.

FIGS. 3 and 4, which are described together below, show an electric drive assembly 17 with a parking lock unit 2 according to FIGS. 1 and 2.

The electric drive assembly 17 comprises an electric machine 18, a reduction gearing 19 drivingly connected to the electric machine 18 for transmitting a torque, a parking lock unit 2 as described above, and a differential gearing 20 drivingly connected to the reduction gearing 19 for receiving a torque. The electric drive assembly 17 further comprises a housing assembly 15 in which the electric machine 18, the reduction gearing 19, the parking lock unit 2 and the differential gearing 20 are arranged.

The reduction gearing 4 comprises a transmission shaft 22, whose longitudinal axis is arranged parallel and offset to the longitudinal axis of a motor shaft 16 and which is rotatably supported by two bearings 24, 25. The transmission shaft 22 can also be called intermediate shaft. A switchable input gear 27 is mounted on the transmission shaft 22 and meshes with a drive pinion 21 of the motor shaft 16. An output pinion 28 is connected to the transmission shaft 22 in a rotationally fixed manner and meshes with a ring gear 29 for driving the differential gearing 20. The ring gear 29 is rigidly connected to the differential carrier 30 of the differential gearing 20 and can be designed integrally therewith, for example.

The parking ratchet wheel 5 of the parking ratchet unit 2 is rotationally fixedly connected to a free shaft end 23 of the transmission shaft 22 via a shaft-hub connection and is axially secured by a circlip 26. The parking ratchet wheel 5 has an engagement portion 8, a web portion 9 and a connecting portion 10. The center plane E1 of the engagement portion 8 has a smaller distance to the center plane E3 of the bearing 24 than the center plane E2 of the connecting portion 10. The engagement portion 8 is partially overlapping a housing portion in which the bearing 24 is rotatably mounted. This allows the axial installation space of the electric drive assembly 17 to be reduced. In addition, the force application plane of the radial force component of an impact, when the locking element 6 engages the parking ratchet wheel 5, is arranged closer to the bearing 24. This reduces the resulting load on bearing 24.

The web portion 9 increases the resulting torsional length of the power path between the parking ratchet wheel and the output shafts of the differential 20 (not shown) on the one hand and between the parking ratchet wheel and the drive unit on the other hand and reduces the torsional stiffness of the power path. In addition, the engagement portion 8 can move radially when the parking lock engages. As a result of these two effects, more energy from the impact when the locking element 6 engages with the parking ratchet wheel 5 can be converted into tension energy and/or (elastic) deformation energy, thus reducing the load on the machine elements of the electric drive assembly 17.

By placing the parking ratchet wheel 5 on the free shaft end 23, additional deformation energy can be absorbed, since when the parking wheel 5 is radially loaded, the free shaft end 22 can also deflect radially in the direction of the force introduction direction like a bending beam.

The housing assembly 15 is composed of several individual housing parts. In particular, the housing assembly 15 comprises a first housing portion 31, in which the electric machine 18 and the bearing 25 of the transmission shaft 22 are accommodated, as well as a second housing portion 32 and an intermediate plate 33, in which the differential gearing 20 and the bearing 24 are accommodated. The intermediate plate 33 is located between the first and second housing portions 31, 32 and is firmly connected to them. The parking lock housing 3 in this embodiment is partially integrated in housing portion 32. However, it is also possible that the parking lock housing 3 is designed separately and can be detachably connected to the housing portion 32.

LIST OF REFERENCE SIGNS 2 parking lock assembly
3 parking lock housing
4, 4' housing portion
5 ratchet wheel
6 locking element
7 actuator
8 engagement portion
9 web portion
10 connection portion
11 positioning section
12
13 engagement recesses
14 ratchet tooth
15 housing assembly
16 motor shaft
17 electric drive assembly
18 electric machine
19 reduction gearing
20 differential gearing
21 drive gear
22 transmission shaft
23 free shaft end
24, 24', 24" bearing
25, 25', 25" bearing
26 circlip
27 input gear
28 output gear
29 ring gear
30 differential carrier
31 housing portion
32 housing portion
33 intermediate plate
A distance
B width
E middle plane
α inclining angle

The invention claimed is:

1. A parking lock unit for a drive assembly, comprising:
a parking lock housing,
a parking ratchet wheel comprising a connecting portion and an engagement portion which are connected to one another via a web portion extending at an inclined angle,
wherein the connecting portion of the parking ratchet wheel is rotationally fixedly connected to a rotatable part of the drive assembly which is rotatably supported about an axis of rotation by at least one bearing,
a locking element which is supported in the parking lock housing and is arranged to lock and release a rotational movement of the parking ratchet wheel about a longitudinal axis of the parking ratchet wheel, and
a controllable locking actuator which is arranged to reversibly transfer the locking element into a position locking the parking ratchet wheel and a position releasing the parking ratchet wheel,
wherein the parking ratchet wheel is formed such that the engagement portion is axially offset with respect to the connecting portion;
wherein a width of a wall of the web portion increases, at least in a partial region, from radially outside to radially inside such that stresses occurring in this partial region are at least substantially constant.

2. The parking lock unit according to claim 1,
wherein a first central plane of the engagement portion of the parking ratchet wheel has a first distance to a second central plane of the connecting portion of the parking ratchet wheel, which first distance is greater than a smallest axial thickness of the web portion.

3. The parking lock unit according to claim 1,
wherein the web portion has a wall that is thinner, at least in a partial region, than the engagement portion and the connecting portion.

4. The parking lock unit according to claim 1,
wherein the parking ratchet wheel is arranged on a projecting free shaft end of the rotatable part of the drive assembly.

5. The parking lock unit according to claim 2,
wherein the first central plane of the engagement portion of the parking ratchet wheel is arranged axially between the second central plane of the connecting portion of the parking ratchet wheel and a third central plane of the bearing arranged closest to the parking ratchet wheel.

6. The parking lock unit according to claim 5,
wherein the ratio of the first distance to a second distance between the second center plane of the connecting portion of the parking ratchet wheel and the third center plane of the bearing closest to the parking ratchet wheel is greater than 0.25, and less than 1.

7. The parking lock unit according to claim 2,
wherein the ratio of the first distance to an outer diameter of the parking ratchet wheel is greater than 0.08, and less than 0.5.

8. The parking lock unit according to claim 7,
wherein the ratio of the first distance to a first width of the parking ratchet wheel at the outer diameter is greater than 0.85, and less than 3.

9. The parking lock unit according to claim 8,
wherein the ratio of the first width of the parking ratchet wheel at the outer diameter to a third width of the parking ratchet wheel at an inner diameter is less than 1.0, and greater than 0.7.

10. The parking lock unit according to claim 1, wherein the locking element is releasably engaged with the engagement portion of the parking ratchet wheel.

11. A drive assembly for electromotively driving a motor vehicle, comprising:
a parking lock unit including a parking lock housing, a parking ratchet wheel with a connecting portion and an engagement portion which are connected to one another via a web portion extending at an inclined angle, wherein the connecting portion is rotationally fixedly connected to a rotatable part of the drive assembly that is rotatably supported about an axis of rotation by at least one bearing, the parking lock unit further including a locking element which is supported in the parking lock housing and is arranged to lock and release a rotational movement of the parking ratchet wheel about a longitudinal axis of the parking ratchet wheel, and a controllable locking actuator which is arranged to reversibly transfer the locking element into a position locking the parking ratchet wheel and a position releasing the parking ratchet wheel, wherein the parking ratchet wheel is formed such that the engagement portion is axially offset with respect to the connecting portion;

a housing assembly;

an electric motor connected to the housing assembly and having a motor shaft which is rotatably drivable;

at least one transmission shaft; and a power splitting unit;

wherein the motor shaft, the at least one transmission shaft and the power splitting unit are each rotatably supported in the housing assembly and are connected to each other via at least one gear stage for transmitting motion and torque, and wherein the rotatable part to which the parking ratchet wheel is connected in a rotationally fixed manner is one of the motor shaft, transmission shaft, and power splitting unit;

wherein a width of a wall of the web portion increases, at least in a partial region, from radially outside to radially inside such that stresses occurring in this partial region are at least substantially constant.

12. The drive assembly of claim 11, wherein the locking element is releasably engaged with the engagement portion of the parking ratchet wheel.

* * * * *